Dec. 8, 1970  G. OLLEARO  3,545,075
MACHINE TOOL WITH AUTOMATIC TOOL CHANGING MECHANISM
Filed Sept. 16, 1968  6 Sheets-Sheet 1

Dec. 8, 1970  G. OLLEARO  3,545,075
MACHINE TOOL WITH AUTOMATIC TOOL CHANGING MECHANISM
Filed Sept. 16, 1968  6 Sheets-Sheet 2

Dec. 8, 1970          G. OLLEARO          3,545,075
MACHINE TOOL WITH AUTOMATIC TOOL CHANGING MECHANISM
Filed Sept. 16, 1968                    6 Sheets-Sheet 4

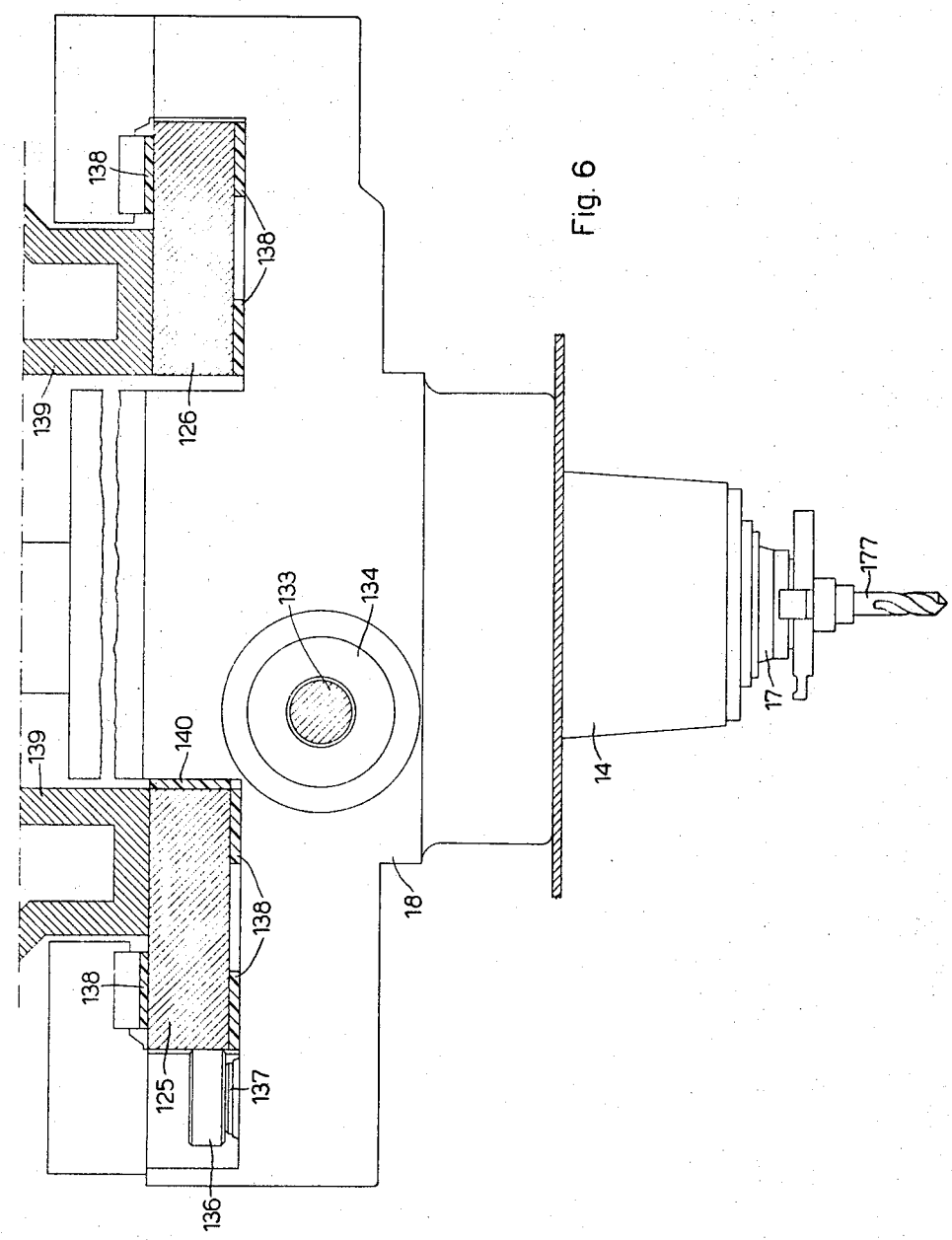

United States Patent Office 3,545,075
Patented Dec. 8, 1970

3,545,075
MACHINE TOOL WITH AUTOMATIC TOOL
CHANGING MECHANISM
Giorgio Ollearo, Ivrea, Torino, Italy, assignor to Ing.
C. Olivetti & C., S.p.A., Ivrea, Torino, Italy, a corporation of Italy
Filed Sept. 16, 1968, Ser. No. 759,915
Claims priority, application Italy, Sept. 16, 1967,
53,046/67
Int. Cl. B23q 3/157
U.S. Cl. 29—568                                              8 Claims

ABSTRACT OF THE DISCLOSURE

A machine tool having an automatic tool-changing mechanism and including a tool-driving spindle rotatable about a predetermined axis, a tool-storage magazine, a plurality of tool holders one of which is mounted on the spindle and the remainder of which are housed in the magazine, each of said tool holders having a tool affixed thereto, an arm pivotable about an axis parallel to the spindle axis for exchanging a spindle-mounted tool holder and tool affixed thereto for one of the magazine-housed tool holders and tool affixed thereto, and a pair of clamping devices mounted on the arm for simultaneously engaging the spindle-mounted tool holder and said one magazine-housed tool holder while the tool holders and tools affixed thereto are being exchanged.

---

The present invention relates to a machine tool with an automatic tool changing mechanism comprising a spindle rotatable about a predetermined axis, a tool storage magazine in which there is housed a series of tool holders on each of which a tool is fixed, said magazine being arranged to move the tools in succession through a tool changing station at which the axis of each successive tool is located parallel to the axis of the spindle, and an arm pivotable about an axis parallel to the axis of the spindle for the purpose of exchanging the tool mounted on the spindle for a tool selected from the magazine, said tool changing station being located in a plane containing the axis of the spindle and the pivot axis of the arm and said arm being normally disposed in said plane.

Various machine tools of the aforesaid type are known. In one known machine with a horizontal spindle, the magazine is disposed above the spindle and the tool changing arm is normally disposed horizontally.

The selected tool is removed from the magazine at a tool ready station and is returned to the magazine at a tool restock station which is different from the tool ready station. The spindle is therefore not aligned vertically with the selected tool, but with a point intermediate the tool ready and restock stations. Moreover, the changing arm is not rectilinear, but angular, in order to bring its two ends alternately into register with these two stations. This machine is rather complicated and the changing of the tool involves a considerable number of movements.

In another known machine, the magazine is disposed above the spindle and has the form of a truncated cone with an inclined axis, as a result of which the machine becomes cumbersome because of its height. Moreover, the arm is normally horizontal, for which reason it has the drawback already mentioned in connection with the previously mentioned known machine.

Finally, there is also known a machine tool with a horizontal spindle and with a cylindrical magazine in which the tools are housed radially. The arm is normally disposed vertically and is provided at each end with two telescopic bars which are pushed out to engage respectively the tool on the spindle and the selected tool in the magazine. The gripping of the tool by the bars, however, is not reliable.

The technical problem which the present invention is concerned to solve is that of automatically changing the tools in a machine tool by providing a single changing station and using a changing arm which is normally in position for gripping the tool, so that it performs the minimum number of movements, while permitting work to be done on workpieces of any size.

This problem is solved by the machine tool according to the invention, which is characterised in that said arm is provided at its two ends respectively with two clamping devices which are diametrically opposed with respect to the pivot axis of the arm, each clamping device comprising two clamping elements which are normally open, each tool holder including a portion which is adapted to pass, during the movement of the magazine, between the clamping elements of the clamping device located at the tool changing station, said spindle being mounted on a slide adapted to be displaced to bring the spindle from a working position to a tool changing position in which said portion of the tool holder mounted thereon is engaged between the clamping elements of the other clamping device.

A preferred constructional embodiment of this invention will now be described by way of example with reference to the accompanying drawings, in which:

FIG. 6 is a section on the line VI—VI of FIG. 3;

Figure 1:
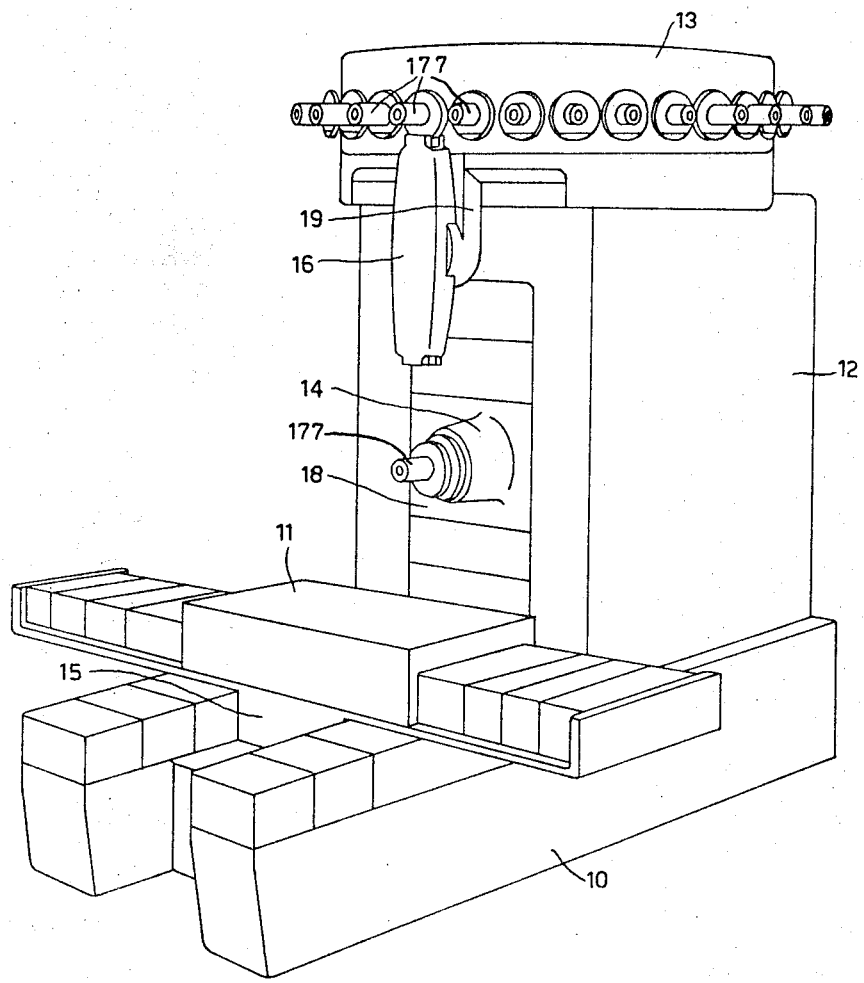
FIG. 1 is a front perspective view from the right of a machine tool incorporating an automatic tool changing mechanism.

Referring to FIG. 1, the machine tool includes a bed 10 on which are mounted a work table 11 and a vertical column 12, on which latter there are mounted a tool magazine constituted by a cylindrical drum 13, a spindle 14 and a tool changing arm 16. The table 11 is supported by a slide 15 which is slidable longitudinally on suitable guides of the bed 10. The table 11 in turn can slide transversely on suitable guides fixed to the slide 15.

Figure 2:
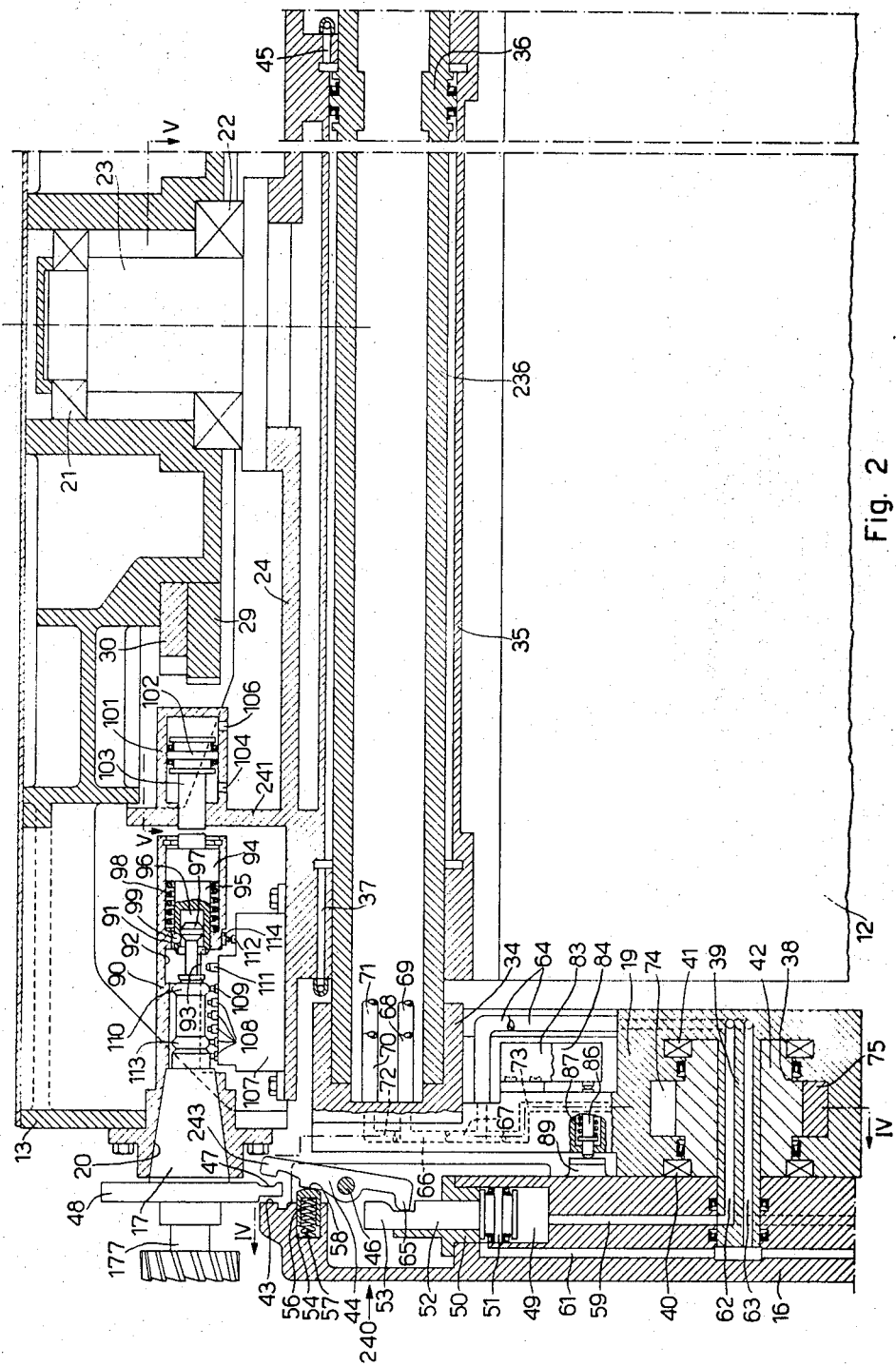
FIG. 2 is a partial vertical longitudinal section of the machine from the right.
Figure 3:
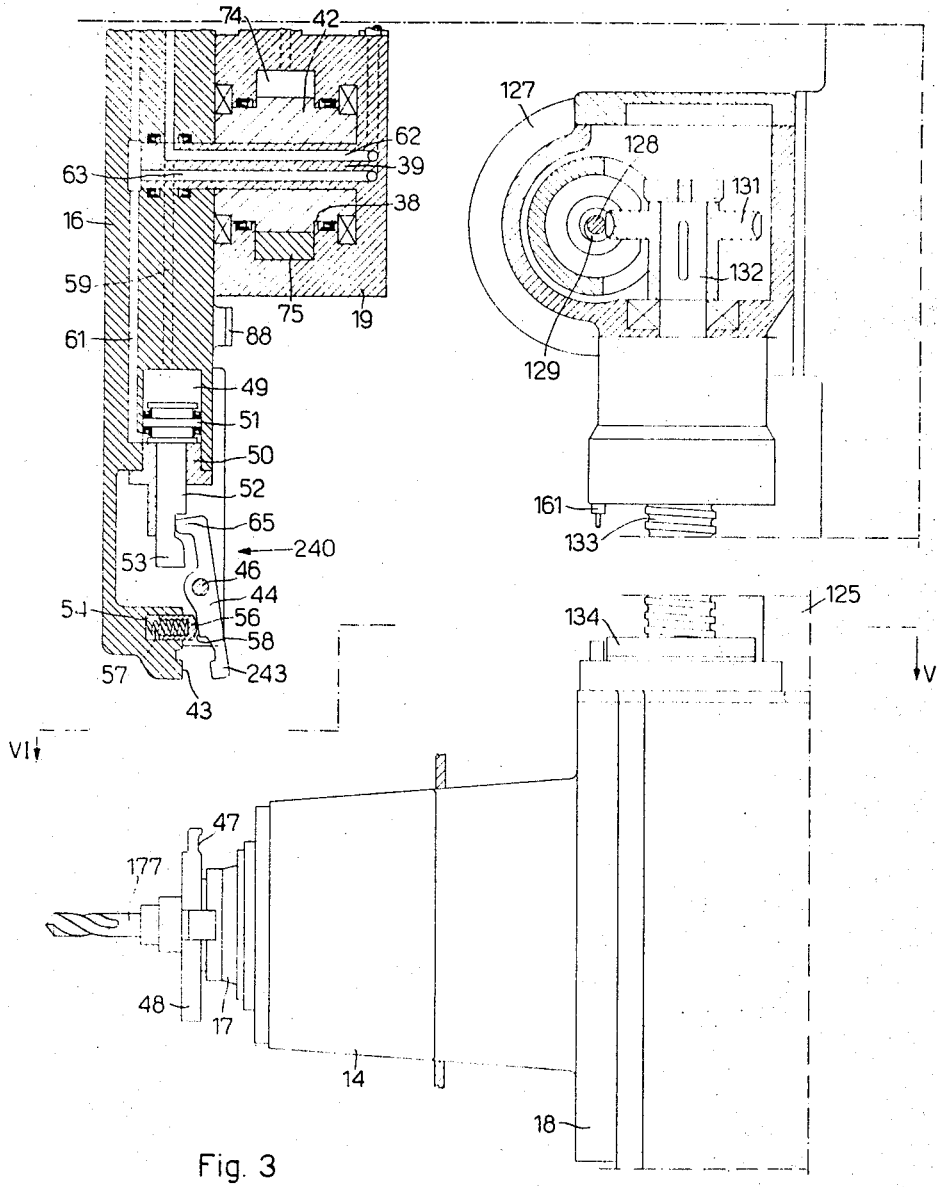
FIG. 3 is a view of part of the machine from the right, in which some of the parts are shown in section.

The drum 13 is mounted above the spindle 14 on the upper end of the vertical column 12 for rotation about a vertical axis. In the periphery of this drum 13 there are provided a series of radially disposed recesses 20 each housing a tool mounted on a tool holder indicated generally by the reference 17 (FIGS. 2, 3 and 6). The spindle 14 is carried by a head 18 and is rotatable about a horizontal axis. The tool changing arm 16 is rotatably mounted on a support 19 which is slidable longitudinally with respect to the column 12 (FIGS. 1 and 2).

All the movements of the various elements are controlled by a digital control device indicated generally by the reference 155 (FIG. 7) which is known per se and is not described here. The programme of this device may be recorded, for example on perforated tape.

Referring next to FIG. 2, the drum 13 is rotatably supported by means of two bearings 21 and 22 on a pivot 23 fixed to a plate 24 of the frame of the vertical column 12. The drum 13 is adapted to be rotated on the pivot 23 through a pair of bevel gears 26 and 27 (FIG. 5) and a pair of spur gears 28 and 29 by means of a hydraulic motor 25 carried by the column 12. The gears 27 and 28 are keyed on the same shaft 200, while the gear 29 is fixed to the drum 13. Also fixed to the drum 13 is a ratchet wheel 30 with which engages a pawl 31 pivoted on a pin 32 secured to the plate 24 and normally urged by the action of a spring 33 against a fixed stop 145.

Below the plate 24 (FIG. 2) of the frame of the column 12 and extending in a diametral direction with respect to the drum 13 is a double-acting hydraulic cylinder 35 in which is slidably arranged a hollow piston 36 fixed to a rod 236 which is likewise hollow. The cylinder 35 is provided at the front end with a duct 37 and at the rear end with a duct 45 for the admission and discharge of oil under pressure. Secured on the front end of the rod 236 is a cap 34 which in turn is fixed to the support 19. The support 19 is provided at the bottom with a cavity 38 in which there is centrally disposed a hollow pivot 39 which is integral with the said support 19.

Mounted in the cavity 38 by means of bearings 40 and 41 is a rotary piston 42 which is rotatable about the pivot 39 and is rigid with the arm 16. The latter is provided with two clamping devices disposed symmetrically with respect to the pivot 39, each clamping device comprising a shoulder 43 (FIGS. 2 and 3) formed on the arm 16 and a clamping element constituted by a lever 44 pivoted on a pin 46 secured to the arm 16. One end 243 of the lever 44 of each clamping device is adapted to engage a notch 47 provided in the flange 48 of any selected tool holder 17. Moreover, the movements of each lever 44 are controlled by a corresponding double-acting hydraulic cylinder 49 closed by a plug 50 and formed in the arm 16. Slidable in each cylinder 49 is a corresponding piston 51 fixed to a rod 52 which projects through the plug 50 and is provided with a cam portion 53 adapted to engage a projection 65 of the associated lever 44. The latter is provided with a shoulder 58 which engages with a pin 56 inserted in a recess 54 in the arm 16 and urged towards the lever 44 by a compression spring 57.

Figure 4:
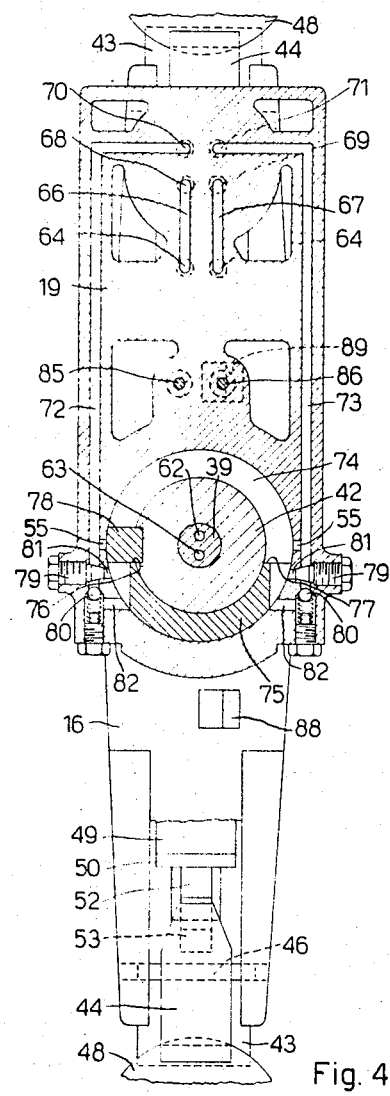
FIG. 4 is a fragmentary cross-section on the line IV—IV of FIG. 2.

The oil can enter the two cylinders 49 simultaneously through one or the other of a pair of ducts 59 and 61 formed in the arm 16. The two ducts 59 are connected to a duct 62, while the two ducts 61 are connected to a duct 63. The ducts 62 and 63 extend through the pivot 39 and the rear portion of the body of the support 19. The ducts 62 and 63 are connected respectively through two connecting ducts 64 (FIG. 2) to two ducts 66 and 67 formed in the support 19 (FIG. 4). The ducts 66 and 67 are connected respectively to two conduits 68 and 69 (FIG. 2) extending through the cavities in the rod 236 and in the piston 36 and terminating at a hydraulic power source known per se and not shown in the drawings. Connected to this power source are two further conduits 70 and 71 also extending through the cavities in the rod 236 and in the piston 36 and connected respectively to two ducts 72 and 73 which are formed in the support 19 and open into an annular cavity 74 through two diametrically opposite orifices 55 (FIG. 4). The cavity 74 is a peripheral extension of the cavity 38 (FIG. 2) and constitutes an annular chamber having a diameter larger than the cavity 38. Housed in the cavity 74 is an annular sector 75 fixed to the support 19 and formed with two shoulders 76 and 77 providing two end stop abutments for a key 78 engaged in the cylindrical surface of the piston 42 and projecting therefrom. In addition, the two ducts 72 and 73 are extended in the support 19 beyond the corresponding orifices 55 and open into the cavity 74 through two further orifices 81 and 82 respectively, in the first of which there is inserted an adjustable plug 79, while in the second there is inserted a ball valve 80 (FIG. 4).

Two microswitches 83 and 84 (FIG. 2) are secured to the support 19 and are adapted to cooperate with two pins 85 and 86 (FIG. 4) respectively, inserted in the support 19. Each of these pins 85, 86 is normally urged forward by a compression spring, such as 87 (FIG. 2). Fixed to the arm 16 are two bosses 88 and 89 (FIG. 4) with inclined surfaces, which bosses are both off-set on the same side with respect to the vertical axis of the arm 16. The bosses 88 and 89 are adapted to cooperate alternately with the two corresponding pins 85 and 86, respectively.

Each tool-mounting recess 20 has a hollow cylindrical portion 90 (FIG. 2) extending inside the drum 13 and provided internally with an annular projection 91, an enlarged diameter portion 92 and a longitudinal slot 93. Slidable in the portion 90 is a piston 94 fixed to a rod 95 having a cavity 96 in which is inserted a portion 97 in the form of a double truncated cone which is in one piece with the tool holder 17. A compression spring 98 is disposed between the piston 94 and the projection 91. The rod 95 is provided in corerspondence with the enlarged diameter portion 92 with three seats at angular intervals of 120°, in which are inserted three balls 99 which can be displaced radially for a certain distance.

Fixed to a cylindrical portion 241 of the frame of the vertical column 12 is a hydraulic cylinder 101 in which is slidably arranged a piston 102 carried by a rod 103 axially aligned with the rod 95 of the piston 94. The cylinder 101 is doubleacting and is provided with orifices 104 and 106 connected to the power source already mentioned for the admission and discharge of oil under pressure.

A box 107 fixed to the plate 24 of the frame of the column 12 contains a series of microswitches 108 adapted to cooperate with a series of rings 113 fixed to the tool holders 17 in accordance with a code combination which identifies the tool holder itself. The box 107 also contains three microswitches 109, 111, 112 for controlling the operating cycle of the machine. The microswitch 109 can cooperate with another ring 110 on the toolholder, while the microswitch 111 can cooperate with the front edge of the rod 95 and the microswitch 112 can cooperate with an abutment 114 fixed adjustably to the outer surface of the portion 90.

Fxed to the plate 24 of the column 12 is a pivot 130 (FIG. 5) on which is rotatably mounted a sleeve 118 integrally formed with two arms 116 and 117. A spring 124 normally holds the arm 116 in bearing contact with one end 141 of a rod 122 slidably mounted in a hollow projection 119 formed integrally with the portion 241 of the column 12. A collar 121 integral with the rod 122 is normally urged towards the arm 116 by a compression spring 123, the action of which prevails over that of the spring 124. The other end 142 of the rod 122 is adapted to cooperate with a microswitch 120. When the drum 13 is in an angular position such that the pawl 31 is in engagement with a tooth of the wheel 30, another tooth of the wheel 30 holds the two arms 117 and 116 in the position shown in FIG. 5 against the action of the spring 123. The end 142 of the rod 122 then engages the microswitch 120, keeping its contacts closed.

The head 18 of the spindle 14 is slidable by means of transverse slides 138 (FIGS. 3 and 6) on two guides 125 and 126 fixed to a portion 139 of the frame of the column 12. A longitudinal slide 140 fixed to the head 18 is moreover slidable on the guide 125. Mounted on the head 18 is a series of adjustable eccentric pivots 137 on each of which there is rotatable a bearing 136 cooperating with the guide 125 on the side thereof remote from the slide 140 to ensure the guiding of the head 18 in the transverse plane. A direct-current electric motor 127 (FIG. 3), which is housed in the column 12, has a shaft 128 on which is mounted a worm 129 engaging with a worm wheel 131. The latter is secured to a vertical shaft 132 carrying at its lower end a screw 133 engaging with a lead nut 134 of the ball type which is fixed to the head 18.

The machine operates in the following manner. During the tooling operation performed by the tool on the spindle 14 (FIG. 1), the digital control device reads the code combination of the required tool on the tape and, thereafter, through an electro-magnetically controlled valve 156 (FIG. 7), causes rotation of the shaft of the motor 25 (FIG. 5) in such a direction that the gear 28 is caused to rotate anticlockwise by the drive transmitted through the pair of bevel gears 26 and 27. The gear 29 is then rotated clockwise together with the ratchet wheel 30 and the drum 13, so that the pawl 31 ratchets over the teeth of the wheel 30. In turn, the spring 123, overcoming the spring 124, displaces the rod 122 so as to release the microswitch 120 from the end 142 of the rod and indicate to the control device 155 (FIG. 7) that the drum 13 is in motion. During this rotation, the teeth of the wheel 30 moreover cause the arm 117 to oscillate together with the arm 116, without any effect on the rod 122.

When the selected tool, that is the tool mounted on a tool holder 17 having rings 113 disposed in accordance with the code combination read on the tape, arrives opposite the box 107 (FIG. 2), the rings 113 act on the corresponding microswitches 108 and the abutment 114 acts on the microswitch 112. The latter, as a result of the coincidence of the code combination read on the tape with that generated by the microswitches 108, operates through the electromagnetically controlled valve 156 to reverse the direction of rotation of the shaft of the motor 25 and, consequently, that of the ratchet wheel 30 which is fixed to the drum 13. This rotation in the reverse direction stops as soon as a tooth of the ratchet wheel 30 encounters the pawl 31 (FIG. 5).

Figure 5:
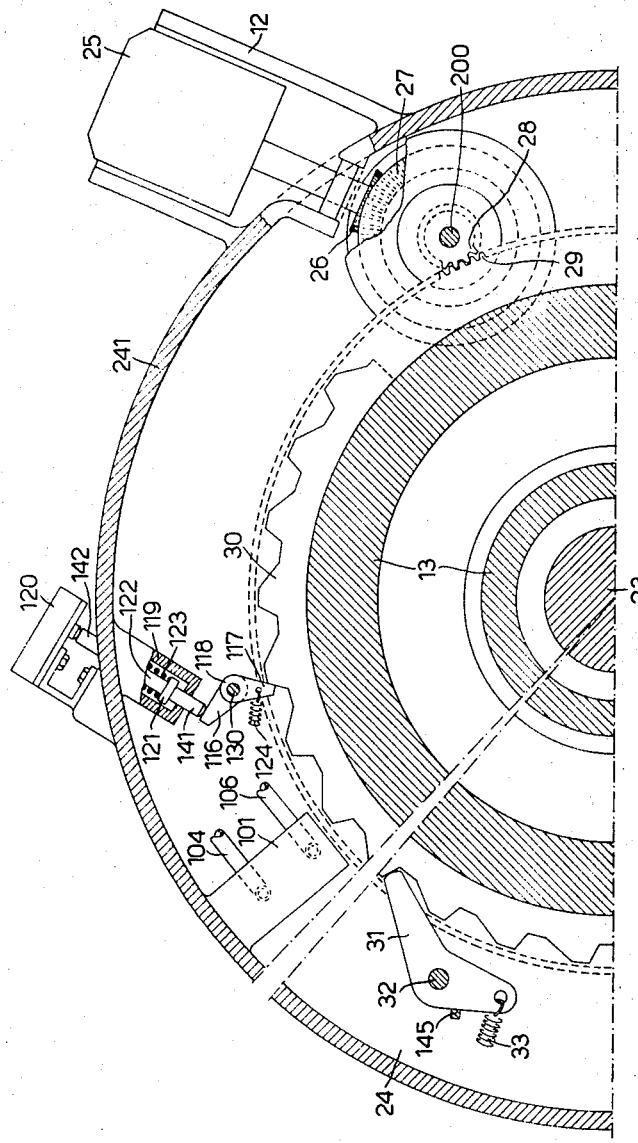
FIG. 5 shows two angularly approached portions of a partial section taken on the line V—V of FIG. 2.

During this rotation in the reverse direction, the ratchet wheel 30 engages the arm 117 with one of its teeth and, overcoming the action of the spring 123, brings this arm into the position shown in FIG. 5. The rod 122 is thereby displaced axially, so that it presses against the microswitch 120, which then indicates to the control device 155 (FIG. 7) that the drum 13 has been located exactly in the desired position. The control device 155 responds by stopping the rotation of the shaft of a motor 160 driving the spindle 14. The device 155 also controls a spindle-orienting mechanism of the type described in the specification of U.S. application Ser. No. 748,534, filed July 29, 1968, for the purpose of obtaining the exact angular positioning of the tool holder 17 (FIG. 3) mounted on the spindle, so as to present the relative notch 47 to the arm 16.

In response to completion of the orientation of the tool holder 17 in the spindle 14, the device 155 (FIG. 7) starts the motor 127, causing its shaft 128 to rotate in a direction such that, by means of the worm 129 (FIG. 3), the worm wheel 131 the screw 133 (FIG. 6) and the lead screw nut 134, it causes the head 18 to move upwards together with the spindle 14. The last part of this movement takes place at a decreasing speed in manner known per se.

At the end of its upward travel, the head 18 engages a microswitch 161, which effects the stopping of the motor 127 so that the spindle 14 is disposed in the position required to enable the tools to be changed.

The tool holder 17 is locked to the spindle 14 by means of a locking device similar to that described in the above-mentioned U.S. application. This locking device is now actuated under the control of a microswitch 161 (FIGS. 3 and 7) through an electro-magnetically operated valve 162 to release the tool holder 17 from the spindle. The occurrence of the release of the tool holder 17 from the spindle is signalled by a microswitch 157. To release the tool holder 17 from the recess 20 in the drum 13, the microswitch 161 (FIG. 7) actuates an electro-magnetically controlled valve 163 which controls the admission of oil under pressure to the cylinder 101 (FIG. 2) through the duct 106, as a result of which the piston 102 acts by means of its rod 103 on the rod 95 of the piston 94. The latter, overcoming the action of the spring 98, performs a stroke such that the balls 99 are moved into register with the undercut portion 92. During this movement of the rod 95, the front end thereof operates the microswitch 111. The microswitches 111 and 157 then actuate an electro-magnetically controlled valve 164 (FIG. 7) which delivers oil to each of the cylinders 49 (FIGS. 2 and 3) through the ducts 61, the duct 63, the corresponding connecting duct 64, the duct 66 and the conduit 68 (FIGS. 2 and 4). Each piston 51 is then shifted inwardly, so that each rod 52 acts by means of the cam portion 53 on the projection 65 of the corresponding lever 44, causing the lever to pivot so that it clamps the notch 47 against the corresponding shoulder 43. A pressure-responsive switch 165 (FIG. 7) connected to the ducts 61 (FIG. 2) indicates the occurrence of the locking of the tool holders 17 to the arm 16 and operates an electromagnetically controlled valve 170 (FIG. 7) whereby oil under pressure is introduced into the cylinder 35 through the duct 45 (FIG. 2). The piston 36 is consequently compelled to move axially towards the left in the drawing. By means of the rod 236, the piston 36 displaces the support 19 together with the pivot 39 and the arm 16, which extracts the tool holders 17 from the drum 13 and from the spindle 14.

Figure 7:
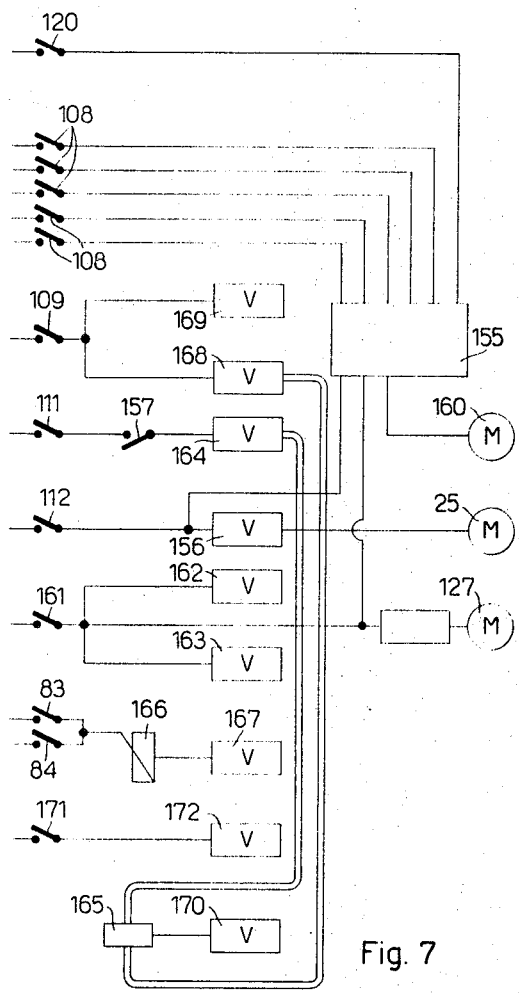
FIG. 7 is a simplified diagram of the control circuit of the machine.

When that portion 97 of the tool holder 17 which is in the form of a double truncated cone encounters the balls 99, it forces them to move radially outward in their respective seats in the rod 95 into positions in which they project partly from said seats into the surrounding space enclosed by the enlarged diameter portion 92. As a result of this, the tool holder 17 can slide freely out of the recess 20 in the drum 13. When the piston 36 reaches the end of its stroke, it actuates a microswitch 171 (FIG. 7) which causes oil under pressure to be admitted through the ducts 70 and 72 (FIG. 4) by means of another electromagnetically controlled valve 172, the oil acting on the key 78 and thereby causing the piston 42 to rotate, together with the arm 16, in a clockwise direction referring to FIG. 4. Initially, the oil passes through the orifice 82, overcoming the action of the spring of the ball valve 80. Thereafter, as soon as the key 78 clears the port 55 leading from the duct 72, the oil passes through this port. The key 78 now compels the oil to flow out through the duct 73. This outflow takes place initially through the corresponding port 55 and, when this port is closed by the key 78, the outflow takes place through the corresponding orifice 81, which is throttled by the plug 79, so that the arm 16 is brought to rest in a gentle and smooth manner. At the beginning of the clockwise rotation of the arm 16, the boss 89 releases the pin 86, as a result of which the microswitch 84 opens without affecting the remote control switch 166 (FIG. 7). At the end of the angular movement of the arm 16 (FIG. 4), the boss 88 engages the pin 85, closing the microswitch 83, which operates an electro-magnetically controlled valve 167 through a remote control switch 166 (FIG. 7). The valve 167 admits oil under pressure into the cylinder 35 through the duct 37 (FIG. 2), thereby returning the piston 36 together with the rod 236, the support 19 and the arm 16 to the position shown in FIG. 2. The tool previously used is inserted into the recess 20 in the drum 13 in place of the selected tool, which is inserted into the spindle 14.

When the ring 110 of the tool holder 17 which is inserted in the recess 20 actuates the microswitch 109, the latter operates an electro-magnetically controlled valve 168 (FIG. 7), which admits oil under pressure into the two cylinders 49 through the ducts 59. The pistons 51 are thereby displaced outwardly, releasing the projections 65 from the cam portions 53 of the rods 52. The two levers 44 can then turn about the pivots 46 under the action of the springs 57 of the plungers and release the flanges of the two tool holders 17. Simultaneously, the microswitch 109 operates another electro-magnetically controlled valve 169, which admits oil under pressure into the cylinder 101 through the duct 104. The piston 102 is thereby displaced towards the right, so that its rod 103 becomes disengaged from the rod 95 of the piston 94. The spring 98 then causes the piston 94 to move to the right, so that, by means of the balls 99 it locks the tool holder 17 in the recess 20 in a position slightly apart from the shoulder 43. The drum 13 is now ready to begin a fresh rotating movement. When the rod 95 returns to the position shown in FIG. 2, it releases the microswitch 111 which, on opening, allows the shaft 128 of the motor 127 to be rotated in the opposite direction to the preceding direction, as a result of which the screw 133 effects the return of the head 18 and the spindle 14 to the lowered position shown in FIG. 3, ready to perform the working required of the new tool. The tool changing cycle is thus complete. It is therefore clear that the tool changing arm 16 is provided at its two ends respectively with two clamping devices which are diametrically opposed with respect to the pivot axis of the arm, each clamping device comprising two clamping elements 43, 44, which are normally open. Each tool holder 17 includes a portion 48 which is adapted to pass, during the movement of the magazine 13, between the clamping elements 43, 44 of the clamping device located at the tool changing station. The spindle 14 is mounted on a slide 18 adapted to be displaced to bring the spindle from a working position to a tool changing position in which said portion 48 of the tool holder 17 mounted thereon is engaged between the clamping elements 43, 44 of the other clamping device.

I claim:

1. A machine tool having an automatic tool changing mechanism, said machine tool comprising:
a frame;
a movable slide carried by said frame;
a tool driving spindle mounted on said slide and rotatable about a predetermined axis, said spindle being movable with said slide from a working position to a tool changing position;
a tool storage magazine carried by said frame;
a plurality of tool holders one of which is mounted on said spindle and the remainder of which are housed in said magazine, each said tool holder having a tool affixed thereto, said magazine including means for successively moving the magazine-housed tool holders and tools affixed thereto through a tool changing station at which the axis of each successive tool is positioned parallel to the spindle axis, said spindle-mounted tool holder and tool affixed thereto being movable with said spindle from said working position to said tool changing position;
an arm carried by said frame and pivotable about an axis parallel to the spindle axis for exchanging said spindle-mounted tool holder and tool affixed thereto for one of said magazine-housed tool holders and tool affixed thereto, said tool changing station being located in a plane containing the spindle and arm pivot axes, said arm being normally disposed in said plane;
a pair of clamping devices each mounted on one end of said arm, said devices being diametrically opposed with respect to the arm pivot axis so that when said arm is disposed in said plane one of said devices will be positioned at said tool changing station, each said device comprising two normally open clamping elements, each of said tool holders including a portion which passes between the elements of said one device when said magazine-housed tool holders are moved through said tool changing station and which moves between the elements of the other device when said spindle-mounted tool holder is moved to said tool changing position;
means for simultaneously closing the clamping elements of both said clamping devices; and
means for moving said slide, spindle, spindle-mounted tool holder and tool affixed to said tool changing position before said clamping elements are closed.

2. A machine tool as recited in claim 1, wherein said spindle is rotatable about a substantially horizontal axis; and wherein said magazine comprises a drum rotatable about a substantially vertical axis for moving any selected tool into said tool changing station, said drum having a plurality of radially extending recesses therein for housing said magazine-housed tool holders; and wherein said arm is normally substantially vertically disposed.

3. A machine tool as recited in claim 2, further comprising a ratchet wheel affixed to said drum, a pawl pivotally mounted on said frame in cooperating relationship with said ratchet wheel, a reversible motor drivingly connected to said drum for rotating the drum in a predetermined direction, and means for controlling said motor so that the motor may be reversed to accurately position and hold said ratchet wheel against said pawl.

4. A machine tool as recited in claim 3, further comprising an actuating means associated with said ratchet wheel and said pawl and operable upon reversal of said motor to actuate said control means.

5. A machine tool as recited in claim 2, further comprising a substantially horizontally disposed cylinder affixed to said frame in diametrical relationship to said drum and in parallel relationship to said spindle, a double-acting piston slidably mounted in said cylinder, a support affixed to said piston and having one end thereof extending away from said cylinder, said one end having a horizontally disposed cylindrical cavity therein spaced from said cylinder, a rotary piston affixed to said arm, said rotary piston being rotatably mounted in said cavity and operable to rotate between two angularly displaced positions 180° apart, a stop element affixed to said piston, and an abutment sector secured to said one end of said support within said cavity and defining two counter-stops each being operable to contact said stop element in one of said two angularly displaced positions of said rotary piston.

6. A machine tool as recited in claim 5 wherein one of the clamping elements of each of said clamping devices comprises a lever pivotally mounted on said arm and the other clamping element of each of said clamping devices comprises an abutment affixed to said arm; and wherein each of said clamping devices further comprises a second cylinder associated with said arm and a second double-acting piston slidably mounted in said second cylinder and connected to said lever; and further comprising first duct means associated with said support and extending parallel to said arm from adjacent said first-mentioned cylinder to adjacent said cavity, said first duct means being adapted to be connected to a source of hydraulic fluid, and second duct means interconnecting said first duct means and said second cylinders so that hydraulic fluid may be introduced simultaneously into both of said second cylinders for simultaneously actuating both of said second pistons.

7. A machine tool as recited in claim 5; wherein a pair of control elements are carried by said support, each of said elements be operable for causing displacement of said double-action piston; and wherein said arm has a pair of operating shoulders thereon for actuating one of said control elements when the arm assumes a first position and the other of said control elements when the arm assumes a second position.

8. A machine tool as recited in claim 6, wherein said second piston of each of said clamping devices is slidable radially of said arm; and wherein each of said clamping devices further comprises a cam affixed to said piston, said cam cooperating with said lever for pivoting the lever, and a spring-biased plunger mounted on said arm for urging said lever toward said cam.

References Cited
UNITED STATES PATENTS

| | | | |
|---|---|---|---|
| 3,355,797 | 12/1967 | Lohneis | 29—568 |
| 3,311,973 | 4/1967 | Anthony et al. | 29—568 |
| 3,286,344 | 11/1966 | Brainard et al. | 29—568 |
| 3,129,506 | 4/1964 | Hain | 29—568 |

FRANCIS S. HUSAR, Primary Examiner